United States Patent
Zhang et al.

(10) Patent No.: US 11,182,347 B2
(45) Date of Patent: **\*Nov. 23, 2021**

(54) FILE SHARING AMONG VIRTUAL CONTAINERS WITH FAST RECOVERY AND SELF-CONSISTENCY

(71) Applicant: International Business Machines Corporation, Armonk, NY (US)

(72) Inventors: Jie Zhang, Beijing (CN); Wei Wang, Beijing (CN); Hong Lin Guo, Beijing (CN); Jian Sun, Beijing (CN); Xin Peng Liu, Beijing (CN); Yun Jie Fang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 175 days.

This patent is subject to a terminal disclaimer.

(21) Appl. No.: 16/511,681

(22) Filed: Jul. 15, 2019

(65) Prior Publication Data

US 2020/0301791 A1    Sep. 24, 2020

Related U.S. Application Data

(63) Continuation of application No. 16/355,956, filed on Mar. 18, 2019.

(51) Int. Cl.
*G06F 16/176* (2019.01)
*G06F 11/14* (2006.01)
(Continued)

(52) U.S. Cl.
CPC .............. *G06F 16/176* (2019.01); *G06F 8/65* (2013.01); *G06F 11/1469* (2013.01);
(Continued)

(58) Field of Classification Search
CPC ...... G06F 11/1469; G06F 8/65; G06F 16/188; G06F 16/176; G06F 2201/80; G06F 2201/815; G06F 2201/82; G06F 9/455
See application file for complete search history.

(56) References Cited

U.S. PATENT DOCUMENTS 9,075,638 B2 * 7/2015 Barnett .................. G06F 9/455
2009/0313259 A1 * 12/2009 Ivanovic ............... G06F 16/176
(Continued)

OTHER PUBLICATIONS

IBM Knowledge Center, "Persisting and sharing data across Docker containers," Platform Application Service Controller 1.1.0, Jan. 30, 2018, https://www.ibm.com/support/knowledgecenter/en/SS3MQL_1.1.0/manage_services/docker_persist_data.html, 3 pages.
(Continued)

*Primary Examiner* — Bryce P Bonzo
*Assistant Examiner* — Michael Xu
(74) *Attorney, Agent, or Firm* — VanLeeuwen & VanLeeuwen; Christopher M. Pignato

(57) ABSTRACT

An approach is provided in which an information handling system creates a set of first containers from a container image that each includes a set of shareable files. The information handling system creates a second container from the container image that is devoid of the set of shared files and includes a pointer that points to a selected one of the first containers. In turn, the second container mounts to the first container and utilizes the shared files included the first container.

15 Claims, 10 Drawing Sheets

(51) Int. Cl.
*G06F 8/65* (2018.01)
*G06F 16/188* (2019.01)

(52) U.S. Cl.
CPC ........ *G06F 16/188* (2019.01); *G06F 2201/80* (2013.01); *G06F 2201/815* (2013.01); *G06F 2201/82* (2013.01)

(56) References Cited

U.S. PATENT DOCUMENTS

| | | | |
|---|---|---|---|
| 2014/0109087 A1* | 4/2014 | Jujare | G06F 9/45558 718/1 |
| 2015/0100826 A1* | 4/2015 | Vujic | G06F 9/5083 714/37 |
| 2017/0052772 A1 | 2/2017 | Chen | |
| 2017/0124345 A1* | 5/2017 | Christiansen | G06F 16/1727 |
| 2017/0169048 A1* | 6/2017 | Fathalla | G06F 16/176 |
| 2017/0193002 A1* | 7/2017 | Shvachko | G06F 16/182 |
| 2017/0235589 A1* | 8/2017 | Gopalapura Venkatesh | G06F 11/2046 718/1 |
| 2018/0025160 A1 | 1/2018 | Hwang | |
| 2018/0121189 A1* | 5/2018 | Philippov | G06F 8/65 |
| 2019/0227830 A1* | 7/2019 | Karve | G06F 9/45558 |
| 2019/0235775 A1* | 8/2019 | Zwiegincew | G06F 3/0604 |
| 2019/0243628 A1* | 8/2019 | Goldmann | G06F 16/188 |
| 2019/0392050 A1* | 12/2019 | Weil | G06F 16/176 |
| 2020/0250049 A1* | 8/2020 | Lee | G06F 11/1469 |

OTHER PUBLICATIONS

McKenna et al., "Mount an Azure file share with Azure Container Instances," Microsoft Docs, Jan. 2, 2018, https://docs.microsoft.com/en-us/azure/container-instances/container-instances-mounting-azure-files-volume, 4 pages.

"List of IBM Patents or Patent Applications Treated as Related," Letter from Leslie A. Van Leeuwen, Jul. 15, 2019, 1 page.

Zhang et al., "File Sharing Among Virtual Containers with Fast Recovery and Self-Consistency," U.S. Appl. No. 16/355,956, filed Mar. 18, 2019, 43 pages.

Zhang et al., "File Sharing Among Virtual Containers with Fast Recovery and Self-Consistency," U.S. Appl. No. 16/511,623, filed Jul. 15, 2019, 44 pages.

\* cited by examiner

| Container List 310 | | | | |
|---|---|---|---|---|
| HOST | CONTAINER ID | BASE IMAGE | VERSION | INCLUDED/MOUNTED SHARED FILES |
| HOST 1 | 1 | TestImage | V1 | Included |
| HOST 1 | 2 | TestImage | V1 | Included |
| HOST 1 | 3 | TestImage | V1 | 1 |
| HOST 1 | 4 | TestImage | V1 | 2 |
| HOST 1 | 5 | TestImage | V2 | Included |
| HOST 1 | 6 | TestImage | V2 | Included |
| HOST 1 | 7 | TestImage | V2 | 5 |

*FIG. 6*

FILE SHARING AMONG VIRTUAL CONTAINERS WITH FAST RECOVERY AND SELF-CONSISTENCY

BACKGROUND

Container technology transforms an application into "containers," which are lightweight, portable, self-sufficient units that execute on a host system and are independent of the host system's installed operating system and applications. Container services, such as Docker, perform operating system level virtualization, also known as "containerization." The container service builds a "container image" from file system layers typically built onto a parent or base image, which encourages reuse of various components. The container image includes system libraries, system tools and other platform settings a software program requires to run on a containerization platform.

The container service registers the container image to a registry and, once registered, the container service generates "container instances" from the container image and deployed to a host system. A container instance, also referred to as a "container instantiation" or a "container," includes its own application, tools, libraries and configuration files to independently execute. Containers provide an additional layer of protection that isolates a particular container from other containers and the host without using incremental resources of the underlying infrastructure. The nature of containers also facilitates a fast and easy application of patches and updates to the container's operating system, applications, and infrastructure layers, which help maintain overall security compliance.

Each container consumes storage on its host system for its various components, referred to herein as "container storage usage." When a container image includes substantially large files, such as read only library files, each instance of the container image also includes the substantially large files. For example, if a container image's library file size is 50-100 GB, then ten instances of the container image consumes 500-1,000 GB of container storage usage on a host system.

An existing approach to reduce multiple containers consuming large amounts of container storage usage is to have each of the containers mount a folder stored on the host machine that stores the large files. Another approach to reduce multiple containers consuming large amounts of container storage usage is to use a separate volume container to serve as a read only file sharing container. Yet another approach to reduce multiple containers consuming large amounts of container storage usage is to use a storage system distinct feature, such as a disk array system that implements similar functions.

BRIEF SUMMARY

According to one embodiment of the present disclosure, an approach is provided in which a method, system, and program product create a set of first containers from a container image that each includes a set of shareable files. The method, system, and program product create a second container from the container image that is devoid of the set of shared files and includes a pointer that points to a first one of the set of shared files included in a selected one of the or more first containers. In turn, the second container mounts to the first set of shared files and utilizes the first set of shared files included the selected first container. As a result, the approach described herein reduces container storage usage of multiple containers and also provides an approach to manage multiple container versions.

According to another embodiment of the present disclosure, an approach is provided in which a method, system, and program product build a container image that includes identifying one or more shareable files and marking the shareable files with shareable file parameters. The method, system, and program product receive a container request and determines whether an amount of active containers that includes the shareable files reaches a threshold. In response to determining that the amount is below the threshold, the method, system, and program product create, from the container image, a new container that includes the shareable files. When the amount of active containers that includes the shareable files reaches the threshold, however, the method, system, and program product create a container devoid of the shareable files.

According to yet another embodiment of the present disclosure, an approach is provided in which the method, system, and program product detect a failure by the second container to utilize the first set of shared files. The method, system, and program product identify a different one of the set of first containers that includes a second one of the set of shared files. The second container mounts the second set of shared files included in the different first container and, in turn, utilizes the second set of shared files included in the different first container.

According to yet another embodiment of the present disclosure, an approach is provided in which the pointer points to a proxy embedded in the second container, and wherein the proxy performs the mounting of the first set of shared files and the mounting of the second set of shared files.

According to yet another embodiment of the present disclosure, an approach is provided in which the method, system, and program product modify a container list entry to indicate that the second container is sharing the second set of shared files included in the different first container.

According to yet another embodiment of the present disclosure, an approach is provided in which the method, system, and program product determine a first container amount of the set of first containers that includes the set of shared files. In response to determining that the first container amount reaches a threshold, the method, system, and program product create the second container that is devoid of the set of shared files.

According to yet another embodiment of the present disclosure, an approach is provided in which the method, system, and program product unmount the second container from the first set of shared files. Then, the method, system, and program product upgrade a version of the second container to an upgraded version second container. The method, system, and program product then identify an upgraded version of the one or more first containers that match the version of the upgraded version second container. In turn, the method, system, and program product mount the upgraded version second container to an upgraded set of shared files included in the identified upgraded version first container.

According to yet another embodiment of the present disclosure, an approach is provided in which the method, system, and program product determine a memory amount consumed by each of the set of shared files included in the one or more first files and, in response to determining that the memory amount reaches a threshold, the method, system, and program product create the second container devoid of the set of shared files.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

According to an aspect of the present invention there is a method, system and/or computer program product that performs the following operations (not necessarily in the following order): (i) creating, from a container image, a set of first containers that each comprise a set of shared files; (ii) creating, from the container image, a second container that is devoid of the set of shared files and comprises a pointer that points to a first one of the set of shared files included in a selected one of the or more first containers; and (iii) utilizing, by the second container, the first set of shared files in response to the second container mounting the first set of shared files included in the selected first container.

According to another aspect of the present invention there is a method, system and/or computer program product that performs the following operations (not necessarily in the following order): (i) building a container image, wherein the building further comprises identifying one or more shareable files and marking the one or more shareable files with one or more shareable file parameters; (ii) creating, from the container image, a new container comprising the one or more shareable files in response to determining that an amount of active containers comprising the one or more shareable files is below a threshold; and (iii) creating, from the container image, the new container that is devoid of the one or more shareable files in response to determining that the amount of active containers comprising the one or more shareable files reaches the threshold.

According to a further aspect of the present invention, there is a computer-implemented method, computer program product and/or computer system for performing at least the following operations (not necessarily in the following order): (i) receiving a first container image; (ii) receiving computer code for a first set of shared files; (iii) generating a first container instantiation from the first container image and the computer code for the first set of shared files so that the files of the first set of shared files can be accessed by operation of the first container instantiation; (iv) generating one or more pointers that point to the computer code for at least a portion of the files in first set of shared files in the first container instantiation; (v) generating a second container instantiation from the first container image and the one or more pointers so that the portion of files of the first set of shared files can be accessed from the first container instantiation by operation of the second container instantiation; and (vi) accessing, by the second container instantiation, the computer code for the portion of files of the first set of shared files by using the one or more pointers in the second container instantiation to locate the computer code for the portion of files within the first container instantiation.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 6 is an exemplary diagram depicting a container list;

DETAILED DESCRIPTION

Figure 1:
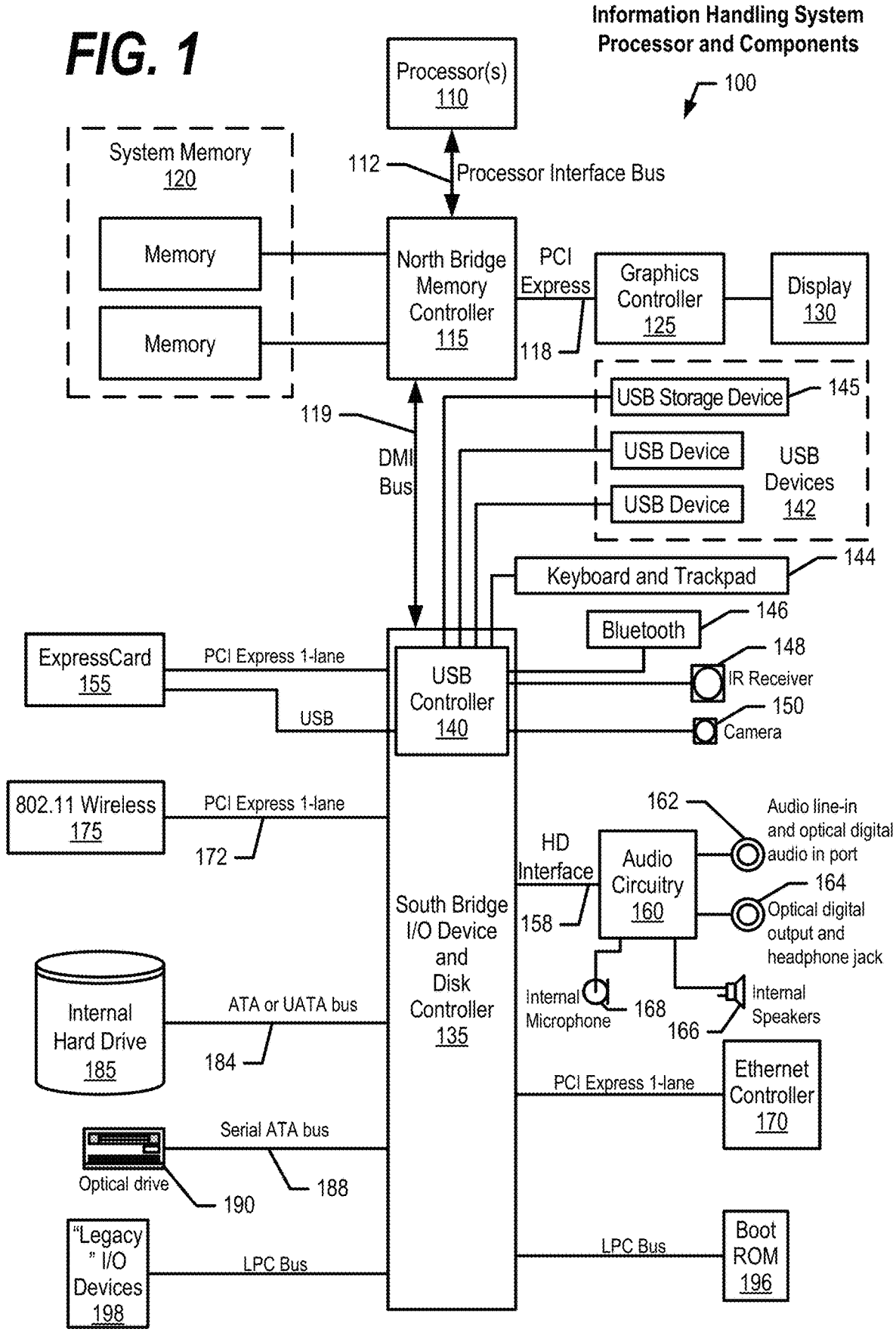
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
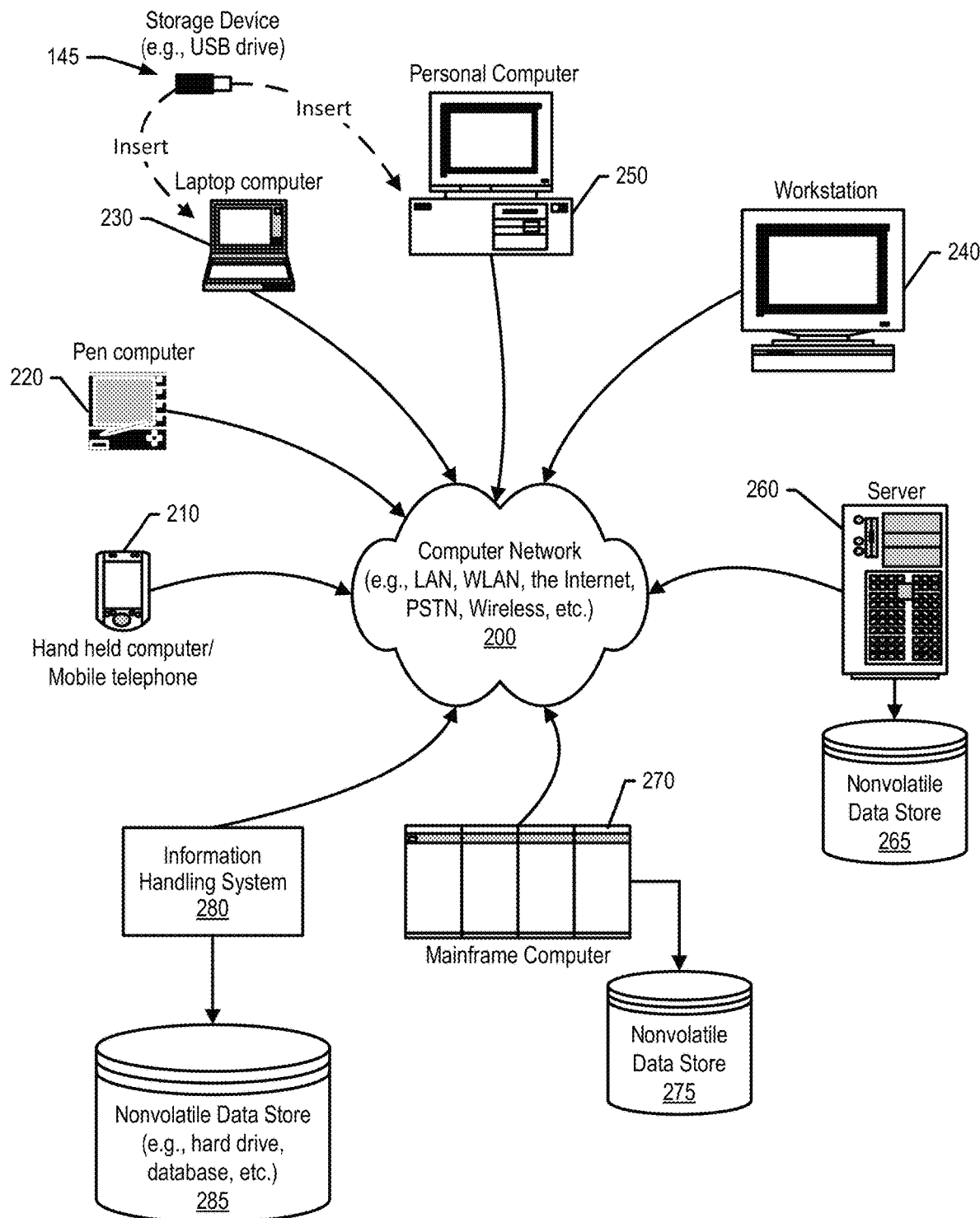
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, challenges arise when multiple containers with large files are dispatched to a host system.

An existing approach to reduce multiple containers consuming large amounts of container storage usage is to have each of the containers mount a folder stored on the host machine that stores the large files. A challenge found with this approach is that the large files are prepared manually outside the container because they are physically stored on the host. Another challenge found is that different versions of the large files (e.g., libraries) need to be managed carefully to avoid conflicts. For example, when a library file version is updated to support a new container image, updating the mount folder may cause the old container versions to fail. Another challenge found with this approach is that a container cannot function on its own during container startup if the library folder is not prepared beforehand on the host system.

Another approach to reduce multiple containers consuming large amounts of container storage usage is to use a separate volume container to serve as a read only file sharing container. This approach, however, has the same shortcomings as discussed above because the approach does not allow managed support for large file (library) version consistency between application containers and the read only file sharing container.

Yet another approach to reduce multiple containers consuming large amounts of container storage usage is to use a storage system distinct feature, such as a disk array system that implements similar functions. This approach, however, requires a specific storage system with the specific distinct features that possibly jeopardizes performance and security and limit portability.

FIGS. 3 through 10 depict an approach to reduce container storage usage for multiple containers whose container image includes large files such as read-only library files. During container image build, a container manager marks large files that are shareable between container instances, such as read-only library files. When the container manager receives a request to create a container from the container image, the container manager determines how many other containers are currently deployed from the same container image and version that included the shareable files. If the amount of currently deployed containers is less than an instance threshold, then the container manager creates a container instance that includes the shareable files. However, when the amount of deployed containers reaches the instance threshold (e.g., two instances), then the container manager creates a container instance devoid of the shareable files, and instead includes a pointer that points to the shareable files included in one of the already deployed containers. In turn, the new container (e.g., an embedded proxy) mounts the shareable files included in the already deployed container to utilize its shareable files. As a result, the approach described herein reduces container storage usage of multiple containers and also provides an approach to manage multiple container versions.

Figure 3:
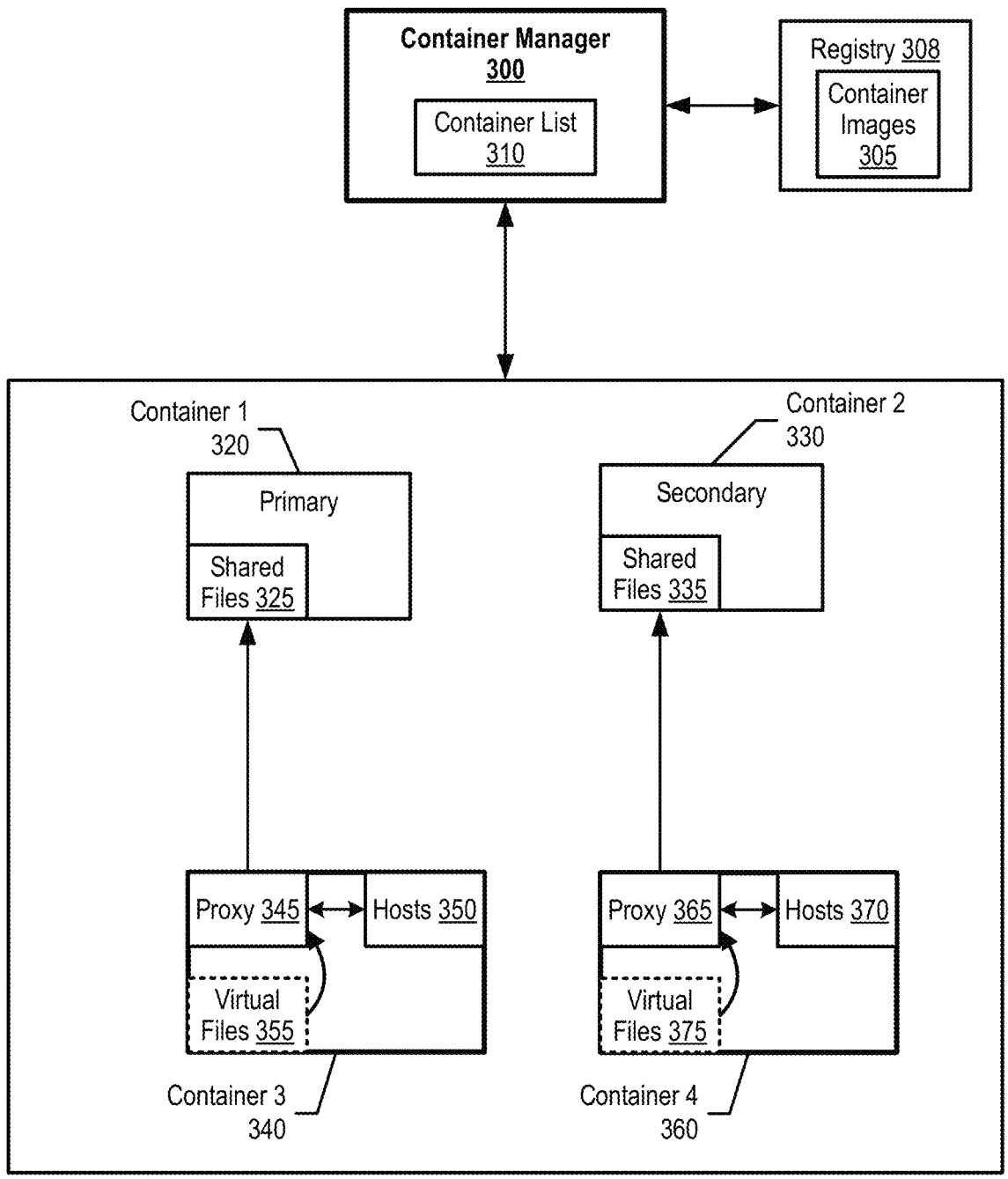
FIG. 3 is an exemplary diagram depicting a container manager that builds container images, creates containers from the container images, and manages the containers using a container list.

FIG. 3 is an exemplary diagram depicting container manager 300 that builds container images, creates containers from the container images, and manages the containers using a container list. Container manager 300 builds container images 305 and registers them with registry 308. During the build, container manager 300 marks files in the container image that are shareable between different container instances. In one embodiment, for example, container manager 300 marks large read-only library files with a new parameter "SHARED_PATH=/lib". In another embodiment, container manager 300 marks shareable files that exceed a size threshold, such as 10 GB.

When container manager 300 receives a request to create an instance of a container image, container manager 300 determines how many containers of the same version are actively deployed. If container manager 300 determines that the amount of deployed containers of the same version is less than a predefined instance threshold, then container manager 300 includes the shareable files into the new container. FIG. 3 shows that container 1 320 includes shared files 325 and container 2 330 includes shared files 335. As discussed herein, shared files are a set of files consisting of computer code, such as read-only files. Container manager 300 manages a container list (container list 310) that logs which containers include the shareable files and which containers are devoid of the shareable files but point to other containers that include the shareable files (see FIG. 6 and corresponding text for further details).

When container manager 300 determines that the amount of deployed containers of the same version reaches the predefined instance threshold, then container manager 300 does not include the shareable files into the new container, but instead stores a pointer in the container that points to a set of the shareable files included in one of the currently deployed containers so that the new container's TCP (Transmission Control Protocol) proxy can mount to the shareable files stored in the currently deployed container. In one embodiment, the pointer is a mount that points to the TCP proxy as the target. The TCP proxy then retrieves an address list of the existing shared file containers as the target and performs a mount and file data retrieval of the shared files.

Assuming that the instance threshold is two, FIG. 3 shows that container manager 300 deployed container 3 340 and container 4 360 without (devoid of) the shareable files. Instead, as discussed below, their corresponding proxies 345 and 365 mount to shareable files 325 and 335 and produce virtual files 355 and 375 that are utilized by their respective containers 340 and 360.

Each container 3 340 and container 4 360 includes an embedded TCP proxy that manages the mounting process. Container 3 340 sends a request to its proxy 345 and proxy 345 mounts to shared file 325 via container 1 320. In turn, a virtualization of shared file 325 resides on container 3 340 (virtualized file 355). Likewise, container 4 360 sends a request to its proxy 365 and proxy 365 mounts to shared file 335 that includes the shareable files. In turn, a virtualization of shared file 335 resides on container 4 360 (virtualized file 375).

Each container also includes a host list 350 and 370 that records the same version containers holding shareable files. In one embodiment, container manager 300 provides container list 310 to containers 3 340 and 4 360 that the containers store as hosts (list) 350 and 370, respectively. In another embodiment, container manager 300 provides a subset of container list 310 that includes same version entries to containers 3 340 and 4 360 that the containers store as hosts (list) 350 and 370, respectively. When a mounted container is down, the proxy uses its corresponding host list to identify other deployed containers that include shareable files. Using their corresponding proxies 345 and 365, containers 3 340 and 4 360 maintain a mounted status and avoid unmount/re-mount actions to connect to new shared library containers (see FIGS. 4, 5, and corresponding text for further details).

With the approach discussed herein, when a container without shared files is down, the remaining containers are unaffected. When container that includes shared files is down, then the other container instances pointing to the downed container dynamically point to another container that includes the shared files according to container list 310 (see FIGS. 4-10 and corresponding text for further details).

Figure 4:
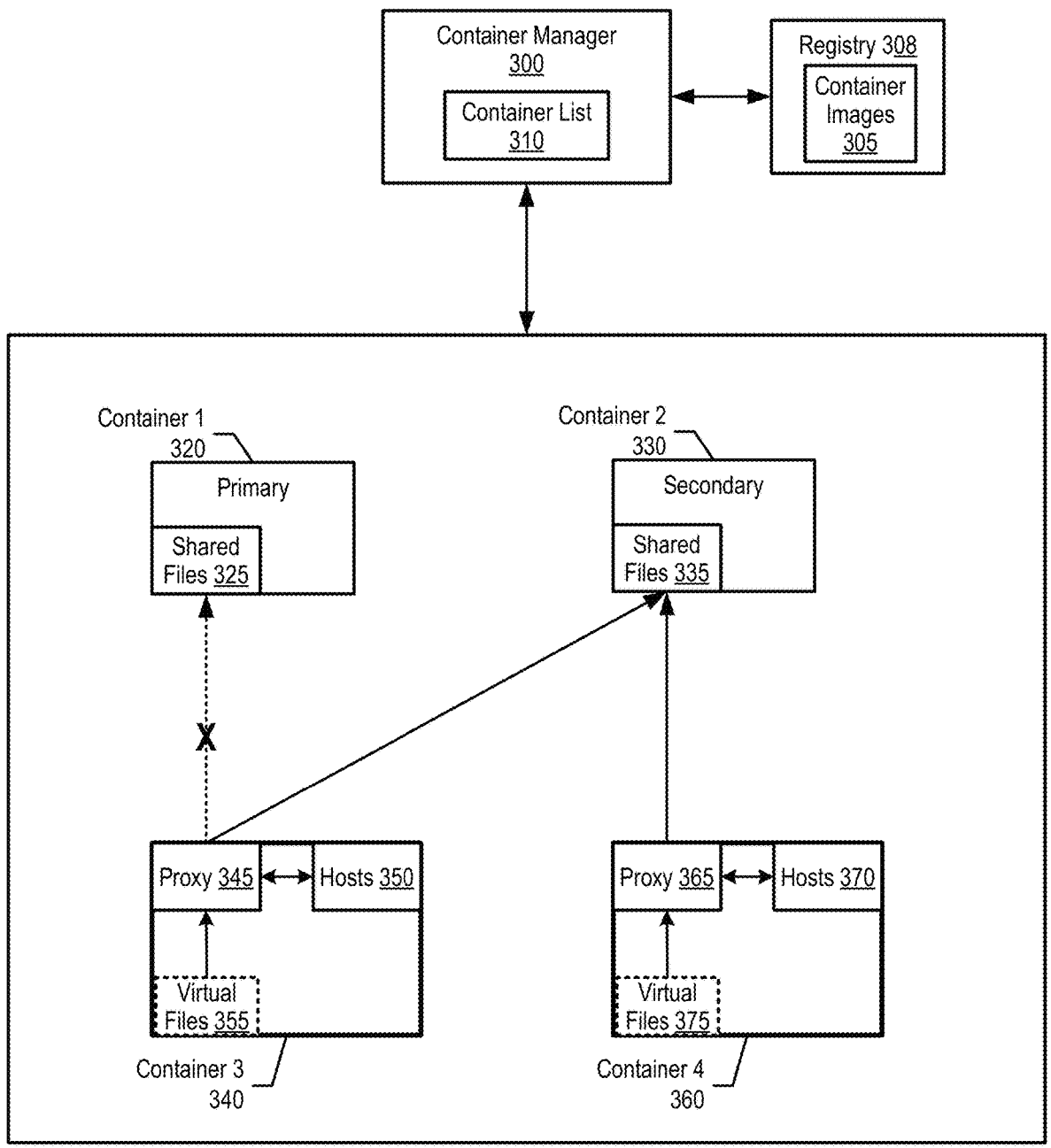
FIG. 4 is an exemplary diagram depicting a container's proxy detecting a failure in a current shared file mount and remounting to a different shared file included in a different container.

FIG. 4 is an exemplary diagram depicting a container's proxy detecting a failure in a current shared file mount and remounting to a different shared file included in a different container. When proxy 345 determines that the connection to shared file 325 fails, or when container 1 320 fails, proxy 345 accesses host list 350 to determine the next container that includes shared files to which to mount. FIG. 4 shows that container 2 330 is next in line and, as such, proxy 345 dynamically mounts to shared files 335 to maintain virtual files 355 and container 3 340's active status. In turn, container manager 300 modifies container list 410 accordingly to indicate container 3 340's mount to container 2 330's shared files 335 (see FIG. 6 and corresponding text for further details).

Figure 5:
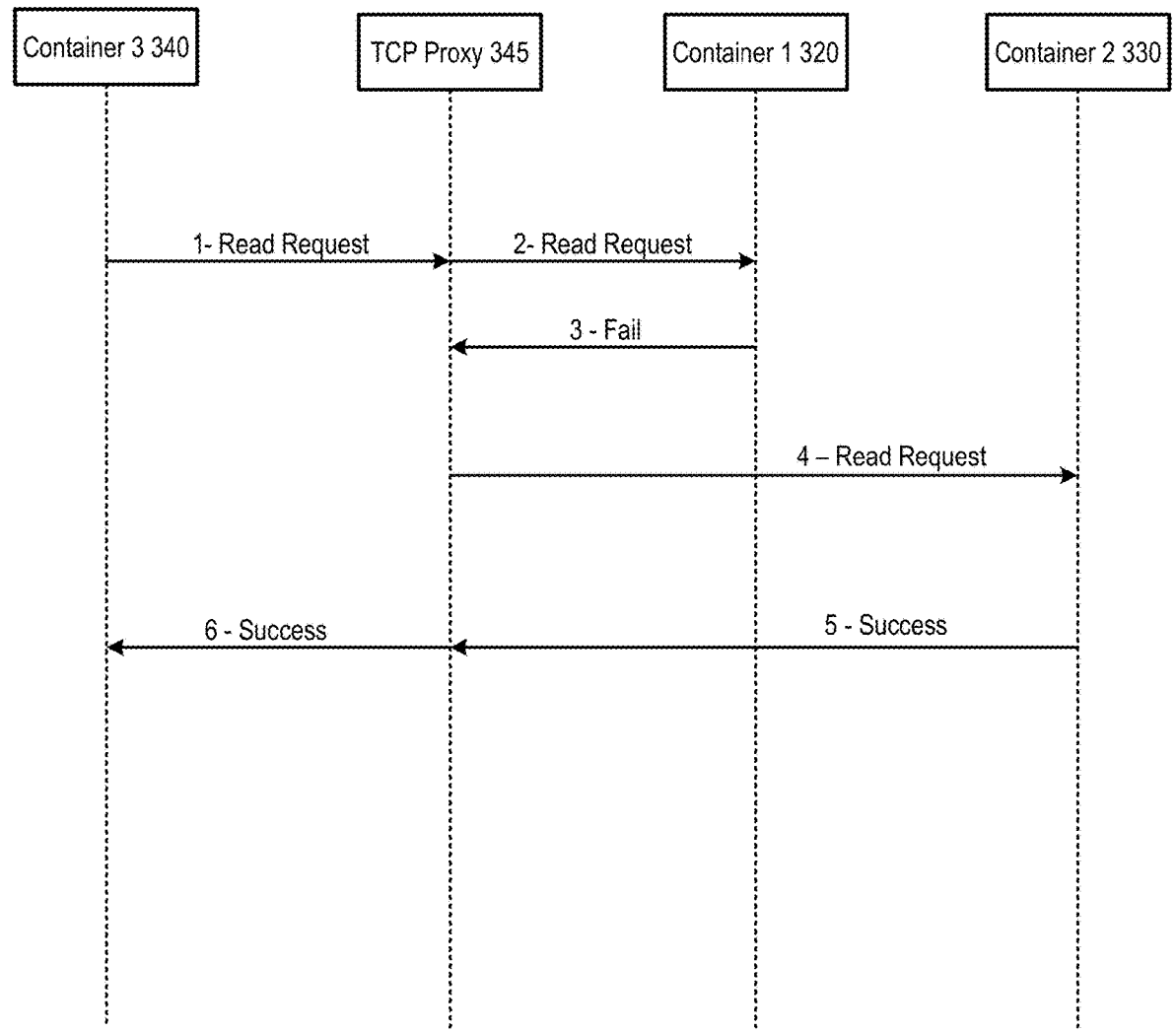
FIG. 5 is an exemplary depicting communication flow between a container's proxy and other containers.

FIG. 5 is an exemplary depicting communication flow between a container's proxy and other containers. Container 3 340 issues a read request (1) to its embedded TCP proxy 345. In turn, TCP proxy 345 issues a read request (2) to container 1 320 (its designated mount). When container 1 320 response with a fail message (3), or does not respond at all, TCP proxy 345 accesses host list 350 and determines that container 2 330 is the next container to query. In turn, TCP proxy 345 issues a read request (4) to container 2 330. Container 2 330 responds with a success message (5), which TCP proxy 345 passes to container 3 340 as success message (6) and produces virtual files 355 (based on shared files 335) for container 3 340 to utilize.

FIG. 6 is an exemplary diagram depicting a container list. Container list 310, in one embodiment, includes columns 600, 610, 620, 630, and 640. Column 600 includes the name of the host that is executing each container. Column 610 includes the container identifiers (ID) of each of the containers. Column 620 includes the name of the container image (base image) used to create the container.

Column 630 includes the version number of each container. Rows 650, 655, 660, and 665 correspond to containers of the same version (V1), such as the examples shown in FIGS. 3 and 4. As discussed below and shown in FIGS. 7 and 8, the containers may be updated to newer versions (rows 670, 675, and 680 are V2) and container manager 300 ensures that the containers devoid of shared files are mounted to containers of their corresponding version.

Column 640 identifies containers with shared files (rows 650, 655, 670, 675) and mounts by containers devoid of the shared files. Row 660 shows that container 3 is mounted to container 1's shared files. Row 665 shows that container 4 is mounted to container 2's shared files. Row 680 shows that container 7 is mounted to container 5's shared files. As discussed herein, container manager 300 modifies container list 310 accordingly when a container changes versions and when the containers without shared files mount to different containers with shared files.

Figure 7:
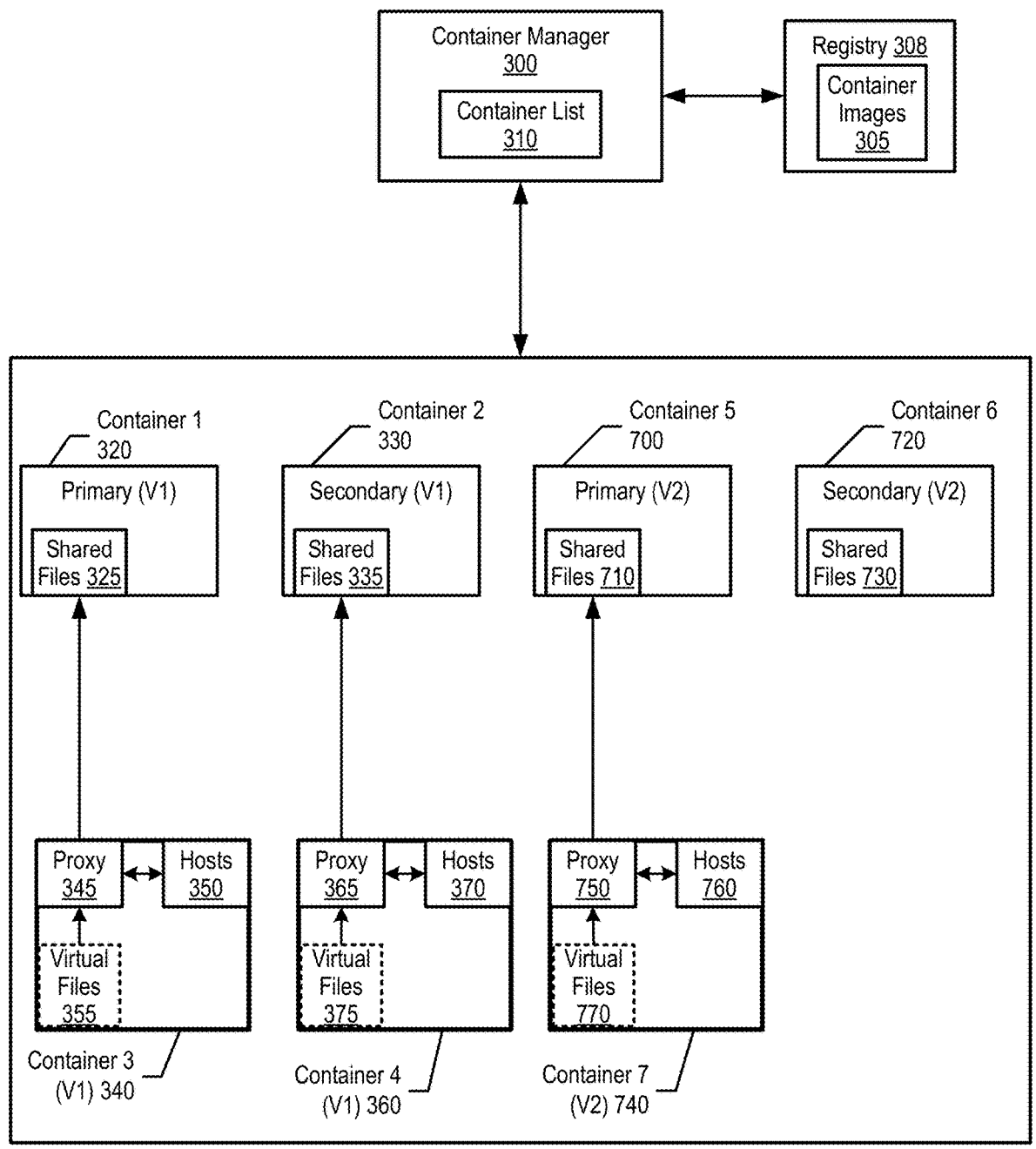
FIG. 7 is an exemplary diagram depicting a container manager managing containers with different versions.

FIG. 7 is an exemplary diagram depicting container manager 300 managing containers with different versions. Container 1 320, 2 330, 3 340, and 4 360 are version 1 (V1) containers. Container 5 700, 6 720, and 7 740 are version 2 (V2) containers. Container 5 700 includes shared file 710 and container 6 720 includes shared file 730. Container 7 740's proxy 750 mounts to shared file 710 (virtual file 770) and references hosts (list) 760 when the mounting to shared file 710 fails as discussed herein.

Figure 8:
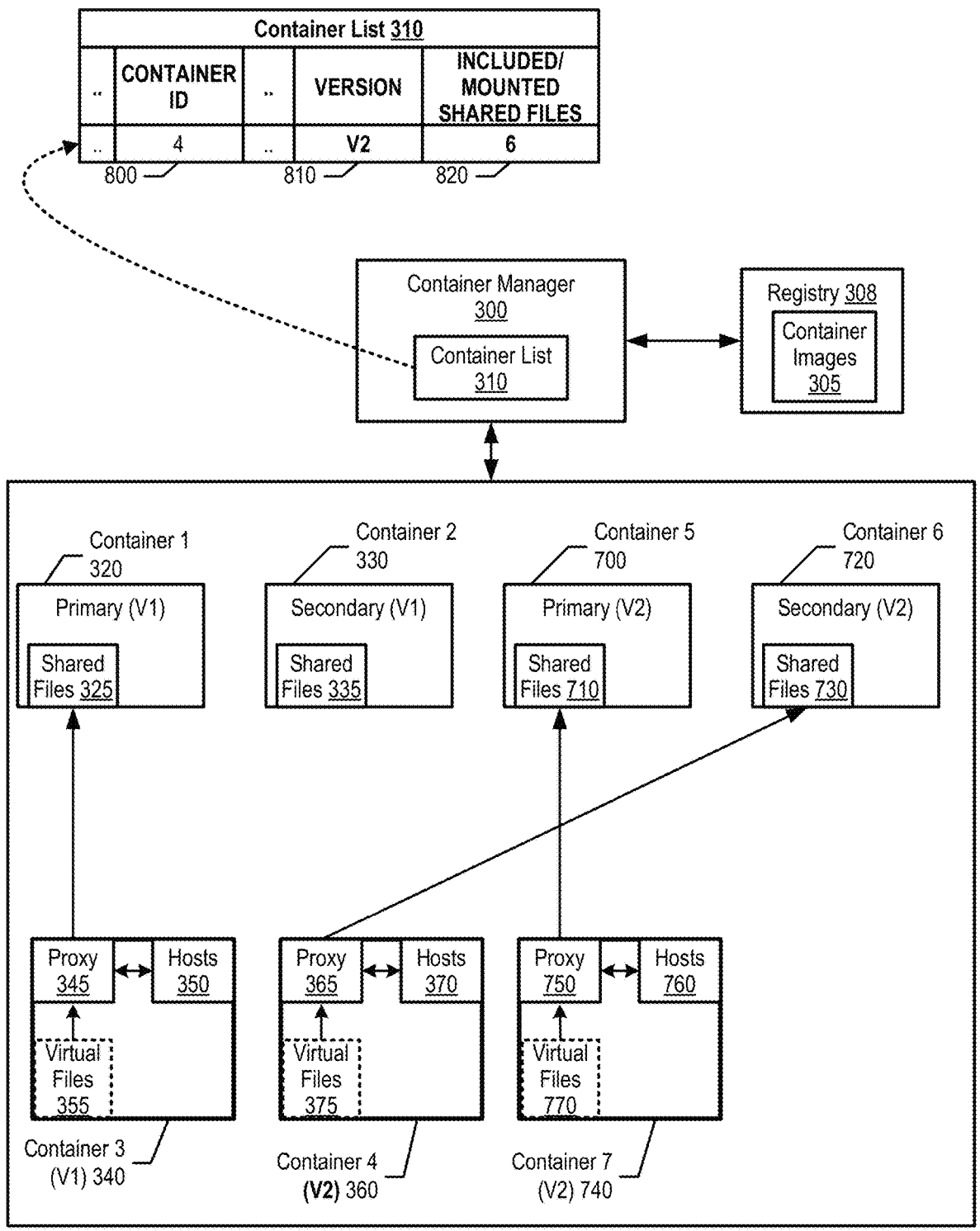
FIG. 8 is an exemplary diagram depicting a container version upgrade and a proxy dynamically mounting to an equivalent version shared file.

FIG. 8 is an exemplary diagram depicting a container version upgrade and a dynamic mount to an equivalent version shared file. Container manager 300 upgrades container 4 360 from version 1 to version 2 and determines that container 6 720 is the appropriate container to mount (see FIG. 6 and corresponding text for further details). As such, proxy 365 unmounts from shared file 335 and mounts to shared files 730 during the upgrade. Container manager 300 updates container list 310's entry of container 4 (800) and changes its version to V2 (810) and points to container 6 720 (820). Proxy 365 then monitors the mounting to shared files 730 as discussed herein and remounts to other shared files of version 2 when required (see FIG. 10 and corresponding text for further details).

Figure 9:
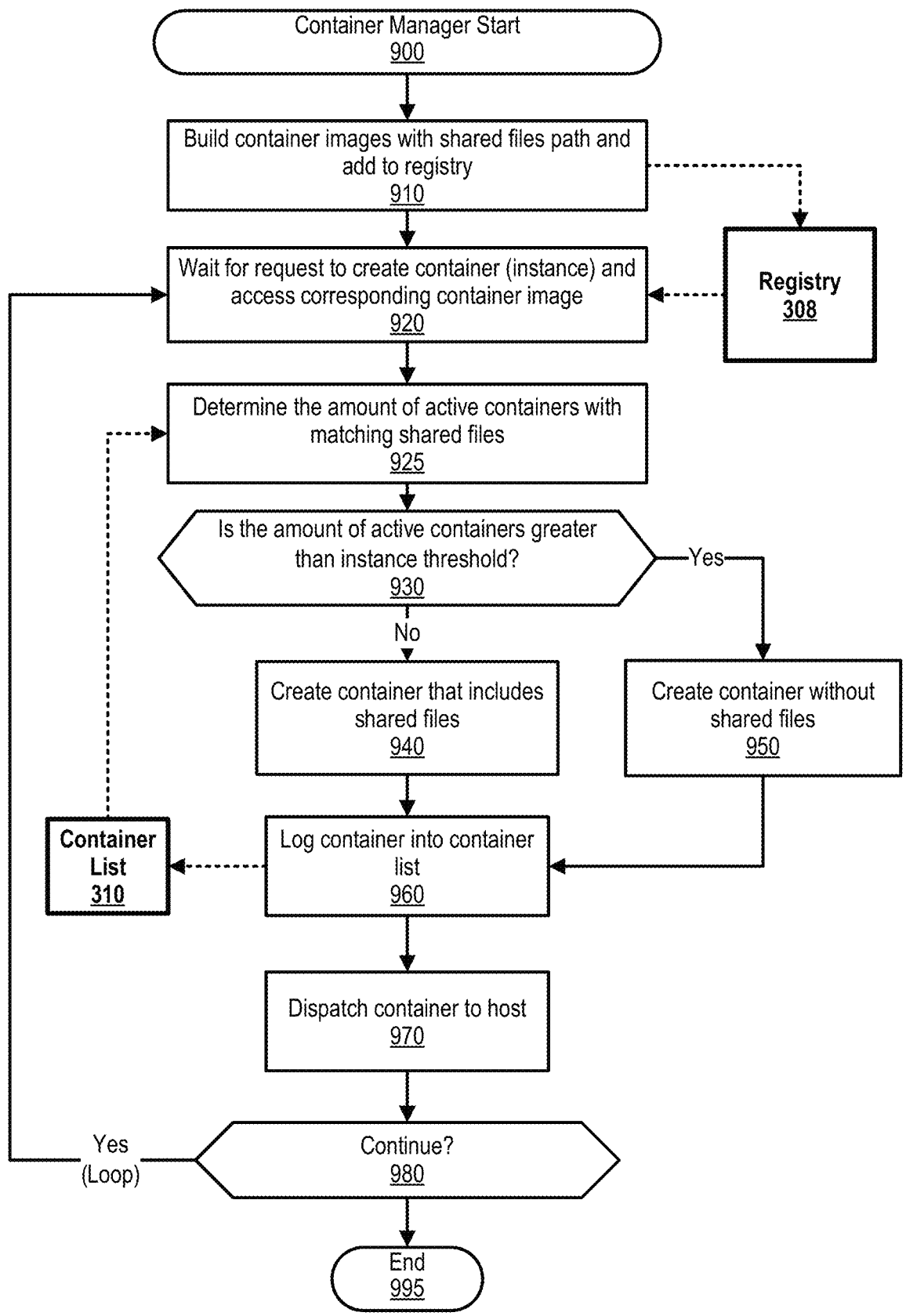
FIG. 9 is an exemplary flowchart depicting steps taken by a container manager to create container images and dispatch containers that include either shared files or pointers to shared files.

FIG. 9 is an exemplary flowchart depicting steps taken by container manager 300 to create container images and dispatch containers that include either shared files or pointers to shared files. FIG. 9 processing commences at 900 whereupon, at step 910, the process builds container images that marks shareable files (e.g., large read only files, library files, etc.) and adds the container images to registry 308. For example, container manager 300 marks library files with a new parameter "SHARED_PATH=/lib." In turn, as discussed below, when container manager 300 receives a container instance request, container manager 300 recognizes the new parameter and either adds a shared file to the new container or adds a pointer to the new container that points to an existing container having the shared files.

At step 920, the process waits for a container request (e.g., from a host) accesses the corresponding container image from registry 308. At step 925, the process determines the amount of containers (same base image and version) that are currently active and include the shared files. Referring to FIG. 3, the amount of containers including shared files is two (container 1 320 and container 2 330).

The process determines as to whether the amount of active containers having shared files is greater than a predefined instance threshold (decision 930). For example, when the predefined instance threshold is two, the third request for the same container exceeds the threshold. In one embodiment, the instance threshold is dynamic and is based on the size of the shared files to manage the amount of storage required by active containers. For example, a container using a large shared library may have an instance threshold of two, but a container using a smaller shared library may have an instance threshold of four. In another embodiment, the process tracks the total amount of memory consumed by shareable files in the multiple container instances and performs step 930 based on the total amount of memory consumed reaching a threshold.

If the amount of active containers is not greater than the instance threshold, then decision 930 branches to the 'no' branch whereupon, at step 940, the process creates a container that includes the shareable files (e.g., container 1 320).

On the other hand, if the amount of active containers is greater than the instance threshold, then decision 930 branches to the 'yes' branch. At step 950, the process creates a container without the shared files and, instead, includes a pointer, based on the new parameter discussed above, to an active container that stores the correct version of shared files. As discussed below, these containers use a proxy to mount to the other containers that store the shared files based on container list 310.

At step 960, the process logs the container into container list 310. Referring to FIG. 6, the log includes the requesting host (600), the container ID (610), the corresponding container image (base image, 620), the version number (630), and whether the container includes shared files or points to a container that has the shared files (640). At step 970, the process dispatches the container to the requesting host.

The process determines as to whether to continue (decision 980). If the process should continue, then decision 980 branches to the 'yes' branch which loops back to wait for another container request. This looping continues until the process should terminate, at which point decision 980 branches to the 'no' branch exiting the loop. FIG. 9 processing thereafter ends at 995.

Figure 10:
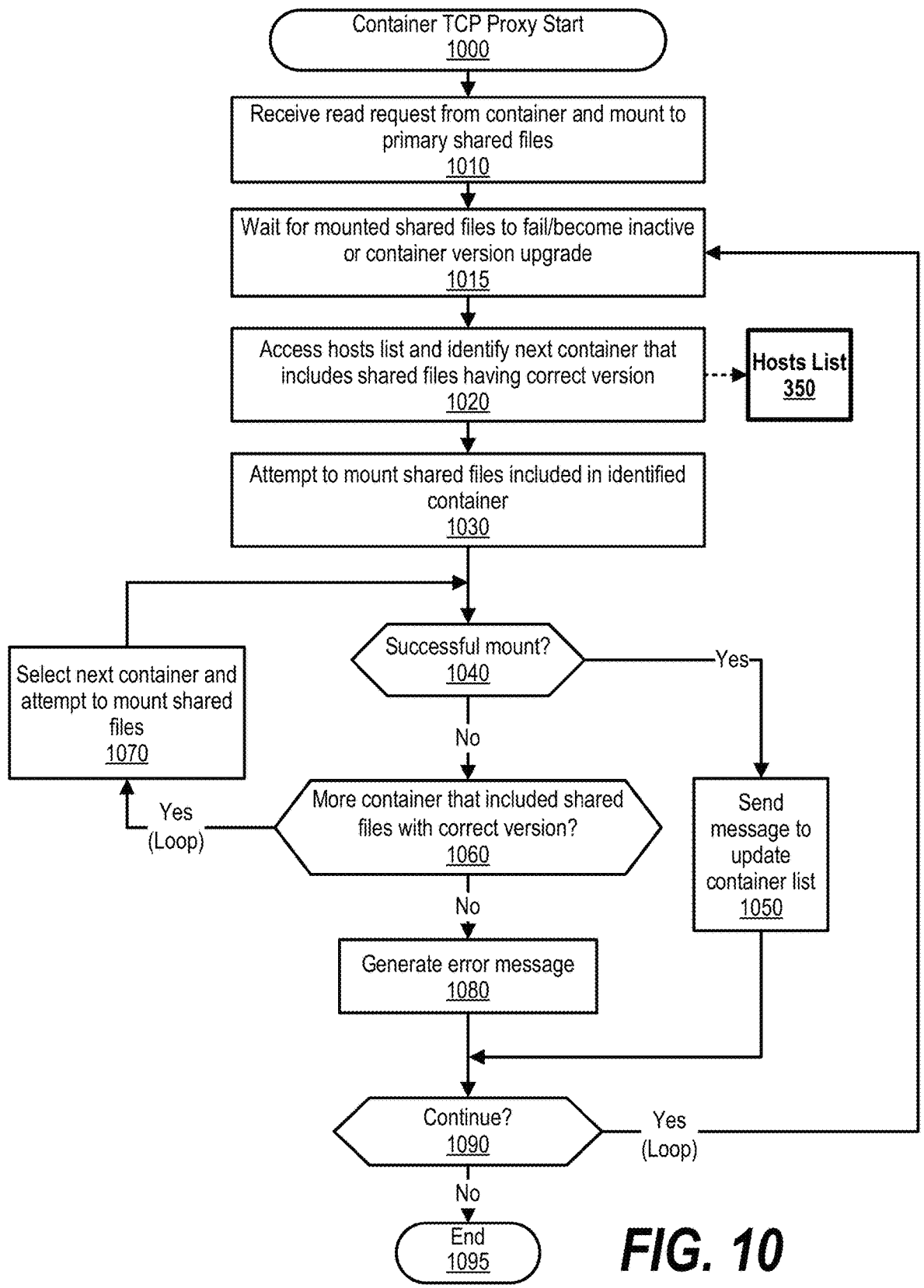
FIG. 10 is an exemplary flowchart depicting steps taken by a proxy embedded in a container to dynamically mount to shared files stored in different containers.

FIG. 10 is an exemplary flowchart depicting steps taken by a proxy embedded in a container to dynamically mount to shared files stored in different containers. FIG. 10 processing commences at 1000 whereupon, at step 1010, the proxy receives a read request from its container and mounts to a set of shared files included in an active container referenced during the container creation. For example, in one embodiment container manager 300 identifies one of the active containers with the shared files and inserts a pointer to point to the identified container during container instance creation (see FIG. 9, step 950 and corresponding text for further details).

At step 1015, the proxy waits for the mounted shared files file to fail, become inactive, or detects a container version upgrade. At step 1020, the proxy (assuming proxy 345) accesses hosts list 350 (a subset of container list 310) and identifies the next container that includes the correct shared files version. Referring to FIG. 5, container 3 340 initially mounts to shared files 325, but when the mount fails (container failure, connection failure, etc.), proxy 345 mounts to container 2 330's shared files 335. Referring to FIGS. 7 and 8, when container 4 360 upgrades from version 1 to version 2, proxy 365 unmounts from shared files 335 and mounts to shared files 730 based on hosts list 370. At step 1030, the proxy attempts to mount to the shared files included in the identified container.

The proxy determines as to whether the proxy successfully mounted to the shared files (decision 1040). If the proxy had a successful mount, then decision 1040 branches to the 'yes' branch whereupon, at step 1050, the proxy sends a message to container manager 300 to update container list 310 with the new container mount information (e.g., changing container 3 340's pointer information from container 2 to container 6).

On the other hand, if the proxy did not have a successful mount, then decision 1040 branches to the 'no' branch. The proxy determines as to whether there are more containers in container list 310 that store shared files with the correct version (decision 1060). If there are more containers that include the shared files with the correct version, then decision 1060 branches to the 'yes' branch which loops back to select the next container and attempts to mount its shared files (step 1070). This looping continues until there are no more containers with a correct version of shared files, at which point decision 1060 branches to the 'no' branch exiting the loop. At step 1080, the proxy generates an error message.

The proxy determines as to whether to continue (decision 1090). If the proxy should continue, then decision 1090 branches to the 'yes' branch which loops back to monitor container processing. This looping continues until the proxy should terminate, at which point decision 1090 branches to the 'no' branch exiting the loop. FIG. 10 processing thereafter ends at 1095.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
   receiving a first container image;
   receiving computer code for a first set of shared files;
   generating a first container instantiation from the first container image and the computer code for the first set of shared files so that the files of the first set of shared files can be accessed by operation of the first container instantiation;
   generating one or more pointers that point to the computer code for at least a portion of the files in first set of shared files in the first container instantiation;
   generating a second container instantiation from the first container image and the one or more pointers so that the portion of files of the first set of shared files can be accessed from the first container instantiation by operation of the second container instantiation;
   accessing, by the second container instantiation, the computer code for the portion of files of the first set of shared files by using the one or more pointers in the second container instantiation to locate the computer code for the portion of files within the first container instantiation;
   in response to upgrading a version of the second container instantiation to an upgraded version second container instantiation:
      unmounting the second container instantiation from the first set of shared files;
      identifying an upgraded version of the first container instantiation in a container list that matches the version of the upgraded version second container instantiation, wherein the upgraded version of the first container instantiation comprises an upgraded set of shared files;
      and
      mounting the upgraded version second container instantiation to the upgraded set of shared files included in the upgraded version of the first container instantiation.

2. The method of claim 1 wherein the container image comprises a shared files parameter that identifies the first set of shared files.

3. The method of claim 1 further comprising:
   detecting a failure by the second container instantiation to mount the first set of shared files;
   identifying a third container instantiation that comprise a second set of shared files;
   mounting, by the second container instantiation, the second set of shared files included in the third container instantiation; and
   utilizing, by the second container instantiation, the second set of shared files included in the third container instantiation.

4. The method of claim 3 wherein the second container instantiation comprises an embedded proxy, and wherein the proxy performs the mounting of the first set of shared files and the mounting of the second set of shared files.

5. The method of claim 3 wherein, in response to mounting the second set of shared files, the method further comprises:
    modifying the container list entry to indicate that the second container instantiation is sharing the second set of shared files included in the third container instantiation.

6. An information handling system comprising:
    one or more processors;
    a memory coupled to at least one of the processors; and
    a set of computer program instructions stored in the memory and executed by at least one of the processors in order to perform actions comprising:
        receiving a first container image;
        receiving computer code for a first set of shared files;
        generating a first container instantiation from the first container image and the computer code for the first set of shared files so that the files of the first set of shared files can be accessed by operation of the first container instantiation;
        generating one or more pointers that point to the computer code for at least a portion of the files in first set of shared files in the first container instantiation;
        generating a second container instantiation from the first container image and the one or more pointers so that the portion of files of the first set of shared files can be accessed from the first container instantiation by operation of the second container instantiation;
        accessing, by the second container instantiation, the computer code for the portion of files of the first set of shared files by using the one or more pointers in the second container instantiation to locate the computer code for the portion of files within the first container instantiation;
        in response to upgrading a version of the second container instantiation to an upgraded version second container instantiation:
            unmounting the second container instantiation from the first set of shared files;
            identifying an upgraded version of the first container instantiation in a container list that matches the version of the upgraded version second container instantiation, wherein the upgraded version of the first container instantiation comprises an upgraded set of shared files;
            and
            mounting the upgraded version second container instantiation to the upgraded set of shared files included in the upgraded version of the first container instantiation.

7. The information handling system of claim 6 wherein the container image comprises a shared files parameter that identifies the first set of shared files.

8. The information handling system of claim 6 wherein the actions further comprise:
    detecting a failure by the second container instantiation to mount the first set of shared files;
    identifying a third container instantiation that comprise a second set of shared files;
    mounting, by the second container instantiation, the second set of shared files included in the third container instantiation; and
    utilizing, by the second container instantiation, the second set of shared files included in the third container instantiation.

9. The information handling system of claim 8 wherein the second container instantiation comprises an embedded proxy, and wherein the proxy performs the mounting of the first set of shared files and the mounting of the second set of shared files.

10. The information handling system of claim 8 wherein, in response to mounting the second set of shared files, the actions further comprise:
    modifying the container list entry to indicate that the second container instantiation is sharing the second set of shared files included in the third container instantiation.

11. A computer program product stored in a computer readable storage medium, comprising computer program code that, when executed by an information handling system, performs actions comprising:
    receiving a first container image;
    receiving computer code for a first set of shared files;
    generating a first container instantiation from the first container image and the computer code for the first set of shared files so that the files of the first set of shared files can be accessed by operation of the first container instantiation;
    generating one or more pointers that point to the computer code for at least a portion of the files in first set of shared files in the first container instantiation;
    generating a second container instantiation from the first container image and the one or more pointers so that the portion of files of the first set of shared files can be accessed from the first container instantiation by operation of the second container instantiation;
    accessing, by the second container instantiation, the computer code for the portion of files of the first set of shared files by using the one or more pointers in the second container instantiation to locate the computer code for the portion of files within the first container instantiation;
    in response to upgrading a version of the second container instantiation to an upgraded version second container instantiation:
        unmounting the second container instantiation from the first set of shared files;
        identifying an upgraded version of the first container instantiation in a container list that matches the version of the upgraded version second container instantiation, wherein the upgraded version of the first container instantiation comprises an upgraded set of shared files;
        and
        mounting the upgraded version second container instantiation to the upgraded set of shared files included in the upgraded version of the first container instantiation.

12. The computer program product of claim 11 wherein the container image comprises a shared files parameter that identifies the first set of shared files.

13. The computer program product of claim 11 wherein the actions further comprise:
    detecting a failure by the second container instantiation to mount the first set of shared files;
    identifying a third container instantiation that comprise a second set of shared files;
    mounting, by the second container instantiation, the second set of shared files included in the third container instantiation; and
    utilizing, by the second container instantiation, the second set of shared files included in the third container instantiation.

14. The computer program product of claim 13 wherein the second container instantiation comprises an embedded proxy, and wherein the proxy performs the mounting of the first set of shared files and the mounting of the second set of shared files.

15. The computer program product of claim 13 wherein, in response to mounting the second set of shared files, the actions further comprise:
   modifying the container list entry to indicate that the second container instantiation is sharing the second set of shared files included in the third container instantiation.

\* \* \* \* \*